US011489930B2

(12) United States Patent
Abhigyan et al.

(10) Patent No.: US 11,489,930 B2
(45) Date of Patent: Nov. 1, 2022

(54) TELECOMMUNICATION NETWORK EDGE CLOUD INTERWORKING VIA EDGE EXCHANGE POINT

(71) Applicant: AT&T Intellectual Property I, L.P., Atlanta, GA (US)

(72) Inventors: Abhigyan, Newark, NJ (US); Bharath Balasubramanian, Princeton, NJ (US); Kaustubh Joshi, Scotch Plains, NJ (US); Oliver Spatscheck, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1 day.

(21) Appl. No.: 16/437,370

(22) Filed: Jun. 11, 2019

(65) Prior Publication Data

US 2020/0396301 A1 Dec. 17, 2020

(51) Int. Cl.
| | | |
|---|---|---|
| *H04L 67/51* | (2022.01) | |
| *H04L 45/52* | (2022.01) | |
| *H04L 47/765* | (2022.01) | |
| *H04L 67/10* | (2022.01) | |
| *H04L 45/50* | (2022.01) | |
| *H04L 45/64* | (2022.01) | |
| *H04L 41/08* | (2022.01) | |
| *H04L 61/50* | (2022.01) | |
| *H04L 67/55* | (2022.01) | |
| *H04L 65/1033* | (2022.01) | |
| *H04W 40/02* | (2009.01) | |

(52) U.S. Cl.
CPC .............. *H04L 67/51* (2022.05); *H04L 41/08* (2013.01); *H04L 45/50* (2013.01); *H04L 45/52* (2013.01); *H04L 45/64* (2013.01); *H04L 47/765* (2013.01); *H04L 61/50* (2022.05); *H04L 65/1036* (2013.01); *H04L 67/10* (2013.01); *H04L 67/55* (2022.05); *H04W 40/02* (2013.01)

(58) Field of Classification Search
CPC ....... H04L 67/16; H04L 67/10; H04L 47/765; H04L 45/50; H04L 45/52; H04L 61/20; H04L 41/08; H04L 67/26; H04L 45/64; H04L 45/34; H04L 45/51; H04L 65/1036
See application file for complete search history.

(56) References Cited

U.S. PATENT DOCUMENTS

| | | | | |
|---|---|---|---|---|
| 6,697,361 | B2 * | 2/2004 | Fredette | H04Q 11/0478 370/389 |
| 7,006,444 | B1 * | 2/2006 | Stone | H04L 12/2854 370/238 |
| 7,477,657 | B1 * | 1/2009 | Murphy | H04L 45/50 370/468 |
| 7,561,580 | B1 * | 7/2009 | Johri | H04L 41/0806 370/395.5 |

(Continued)

*Primary Examiner* — Ramy M Osman

(57) ABSTRACT

A processing system of an edge exchange point including at least one processor may receive, from a cloud service provider a request to allocate a first tag to communications between the cloud service provider and a first telecommunication network, transmit an acceptance of the request to allocate the first tag to the communications between the cloud service provider and the first telecommunication network, obtaining a first packet containing the first tag from the cloud service provider, and transmit the first packet to the first telecommunication network in accordance with the first tag.

20 Claims, 5 Drawing Sheets

(56) References Cited

U.S. PATENT DOCUMENTS

| | | | | |
|---|---|---|---|---|
| 7,668,166 | B1* | 2/2010 | Rekhter | H04L 45/50 370/392 |
| 9,716,727 | B1* | 7/2017 | Seger | H04L 63/1491 |
| 10,382,266 | B1* | 8/2019 | Balakrishnan | H04L 61/2007 |
| 10,708,125 | B1* | 7/2020 | Chen | H04L 65/102 |
| 10,848,423 | B1* | 11/2020 | Chen | H04L 45/50 |
| 11,178,594 | B2* | 11/2021 | Field | H04W 40/246 |
| 2002/0110119 | A1* | 8/2002 | Fredette | H04Q 11/0478 370/389 |
| 2003/0043745 | A1* | 3/2003 | Kano | H04L 45/28 370/238 |
| 2007/0076732 | A1* | 4/2007 | Kim | H04L 45/507 370/409 |
| 2007/0165530 | A1* | 7/2007 | Dong | H04L 45/50 370/235 |
| 2011/0211579 | A1* | 9/2011 | Cao | H04L 45/507 370/392 |
| 2011/0292940 | A1* | 12/2011 | Okamoto | H04L 45/50 370/392 |
| 2013/0308459 | A1* | 11/2013 | Callan | H04L 41/0654 370/235 |
| 2014/0029443 | A1* | 1/2014 | Bhavanam | H04L 45/28 370/244 |
| 2014/0269724 | A1* | 9/2014 | Mehler | H04L 45/30 370/392 |
| 2015/0067171 | A1* | 3/2015 | Yum | H04L 67/2809 709/226 |
| 2016/0308762 | A1* | 10/2016 | Teng | H04L 67/10 |
| 2016/0337175 | A1* | 11/2016 | Rao | H04L 67/1097 |
| 2016/0337193 | A1* | 11/2016 | Rao | H04L 41/0806 |
| 2017/0111220 | A1* | 4/2017 | Kumar | H04L 41/20 |
| 2017/0279710 | A1* | 9/2017 | Khan | H04L 45/507 |
| 2018/0034664 | A1* | 2/2018 | Mulligan | H04L 67/10 |
| 2018/0091323 | A1* | 3/2018 | Haag | H04L 45/24 |
| 2018/0351787 | A1* | 12/2018 | Boyapati | H04L 45/28 |
| 2018/0359323 | A1* | 12/2018 | Madden | H04L 67/104 |
| 2019/0036842 | A1* | 1/2019 | Aranha | H04L 45/50 |
| 2019/0140955 | A1* | 5/2019 | Hemige | H04L 63/0272 |
| 2020/0099625 | A1* | 3/2020 | Yigit | H04L 45/64 |
| 2020/0329119 | A1* | 10/2020 | Xia | H04L 45/64 |
| 2020/0358698 | A1* | 11/2020 | Song | H04L 45/50 |
| 2020/0404059 | A1* | 12/2020 | Feiguine | H04L 67/51 |
| 2022/0159059 | A1* | 5/2022 | Abhigyan | H04L 45/50 |

* cited by examiner

TELECOMMUNICATION NETWORK EDGE CLOUD INTERWORKING VIA EDGE EXCHANGE POINT

The present disclosure relates generally to network edge computing, and more particularly to methods, computer-readable media, and apparatuses for interworking via an edge exchange point among cloud service providers and telecommunication networks using packet tags.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI), that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like, may be instantiated from the common resource pool. In addition, where the network edge has previously been well-defined, the advent of new devices and SDN architectures are pushing the edge closer and closer to the customer premises and to devices that customers use on a day-to-day basis.

SUMMARY

Methods, computer-readable media, and apparatuses for interworking via an edge exchange point among cloud service providers and telecommunication networks using packet tags are described. For instance, in one example, a processing system of an edge exchange point including at least one processor may receive, from a cloud service provider, a request to allocate a first tag to communications between the cloud service provider and a first telecommunication network, transmit an acceptance of the request to allocate the first tag to the communications between the cloud service provider and the first telecommunication network, obtain a first packet containing the first tag from the cloud service provider, and transmit the first packet to the first telecommunication network in accordance with the first tag.

In another example, a processing system of a cloud service provider including at least one processor may transmit, to an edge exchange point, a request to allocate a first tag to communications between the cloud service provider and a first telecommunication network, obtain an acceptance of the request to allocate the first tag to the communications between the cloud service provider and the first telecommunication network, transmit a request to define at least a first action in the first telecommunication network associated with the first tag, obtain an acceptance of the request to define the at least the first action, and transmit a first packet containing the first tag to the first telecommunication network via the edge exchange point.

In still another example, a processing system of a telecommunication network including at least one processor may obtain, from a first cloud service provider, a request to define at least a first action in the first telecommunication network associated with a first tag, transmit, to the first cloud service provider, an acceptance of the request to define the at least the first action, obtain, from the first cloud service provider via an edge exchange point, a first packet containing the first tag, and perform the at least the first action associated with the first tag, in response to obtaining the first packet containing the first tag.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
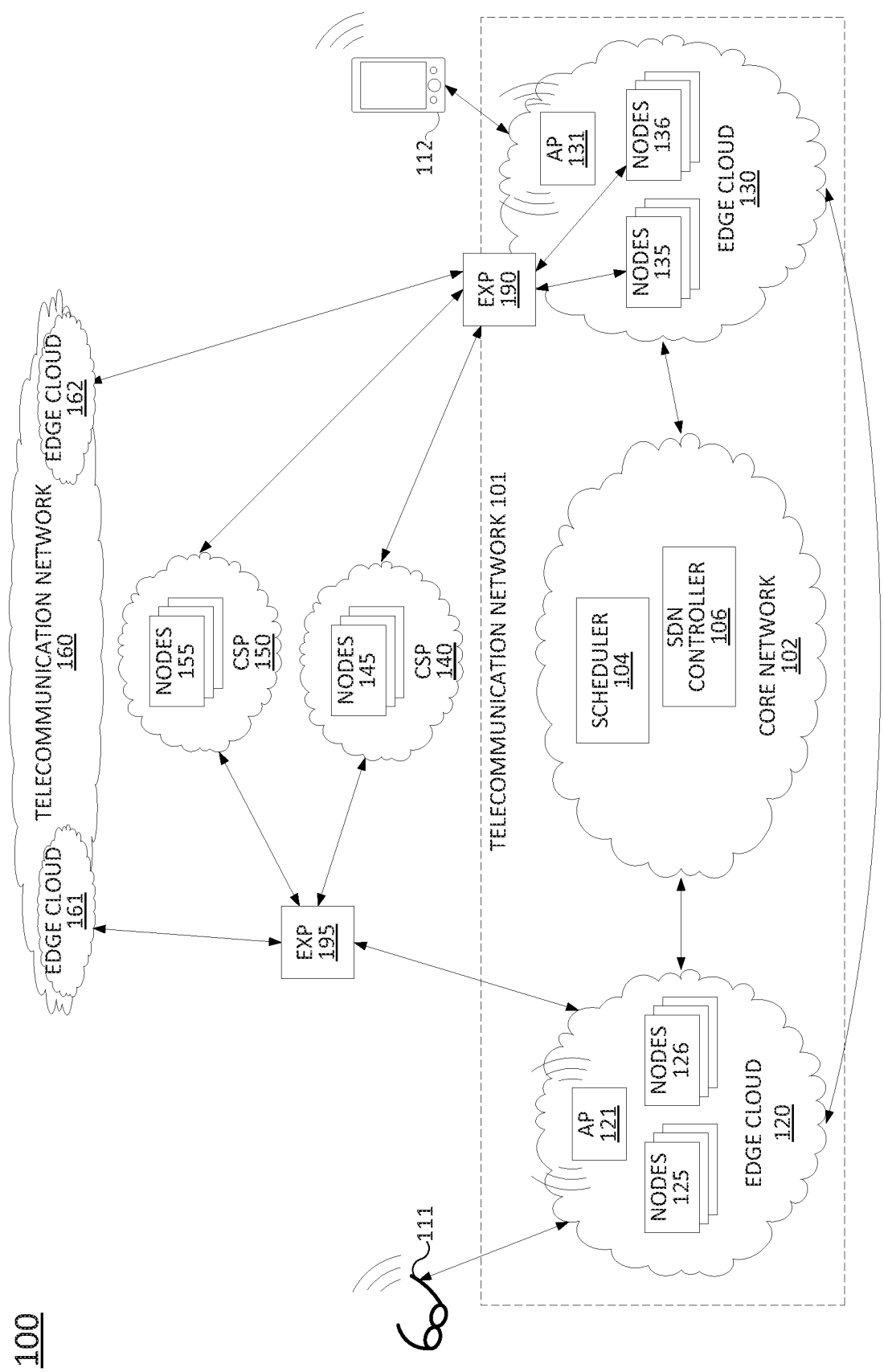
FIG. 1 illustrates an example network related to the present disclosure.

Network designers have sought to enable applications by providing developers with a variety of capabilities including stronger performance and resiliency guarantees, leveraging additional in-network processing, and providing end-user specific metadata. However, these techniques have seen use only for niche applications (e.g., quality of service (QoS) for Voice over Internet Protocol (VoIP)), and limited user groups (e.g. enterprises using Multi-Protocol Label Switching (MPLS) with virtual private network (VPN)).

Examples of the present disclosure define new capabilities that a telecommunication network can make available to edge cloud applications in several categories. For instance, examples of the present disclosure may provide enhanced connectivity between various entities (e.g., end-users, other cloud sites) via an edge exchange point (EXP). In one example, the EXP may be provided by a telecommunication network edge cloud site. This location of these compute resources gives a network provider full control as an intermediary of the route between a cloud application and an edge device. The fact that a single administrative entity controls the entire network path makes it easier to provide architectural capabilities (e.g., QoS, enhanced security, etc.) compared to the public Internet. In addition, the present disclosure may also enable enhanced traffic services, where the telecommunication network may perform additional in-network processing on traffic for a third party edge service. Similarly, the telecommunication network may also provide user metadata services to third party applications via the edge cloud, such as providing user identity and location. In addition, services offered in centralized public clouds to application developers may also be provided by the telecommunication network edge cloud to the third party edge cloud applications.

Examples of the present disclosure also provide an edge stack application programming interface (API) between the underlying network cloud platform and public cloud applications running on a variety of third-party cloud stacks (such as Openstack and AzureStack). In one example, the API enables developers to create edge-optimized applications that draw upon features and services of both cloud service provider edge infrastructure and telecommunication network edge infrastructure. In particular, the API may enable cloud service providers to access features and services of the telecommunication network edge infrastructure. Through these APIs, application developers will have unprecedented proximity to end devices to deploy highly latency sensitive applications, and a platform to which the application developers can readily port their existing cloud applications.

Examples of the present disclosure may be used with any applications which may benefit from edge interconnection between a telecommunication network and a cloud service provider, such as applications requiring low latency or which may have high data/bandwidth requirements, e.g., streaming video, augmented reality, virtual reality, 360 video, volumetric video, video gaming, or other immersive visual streaming services (which may include audio streaming in addition to visual data), audio streaming services, virtual assistants, translation services, security services (e.g., object tracking, facial recognition, etc.), and so on. These and other aspects of the present disclosure are described in greater detail below in connection with the examples of FIGS. 1-5.

To aid in understanding the present disclosure, FIG. 1 illustrates an example system 100 in which examples of the present disclosure for interworking via an edge exchange point among cloud service providers and telecommunication networks using packet tags may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may include a telecommunication network 101. The telecommunication network 101 may comprise a core network 102. The core network 102 may be in communication with one or more edge clouds 120 and 130, and the Internet (not shown). In one example, core network 102 may combine core network components of a cellular network with components of a triple play service network; where triple-play services include telephone services, Internet services and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may further comprise a broadcast television network, e.g., a traditional cable provider network or an Internet Protocol Television (IPTV) network, as well as an Internet Service Provider (ISP) network. In one example, core network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of network 102 are omitted from FIG. 1.

In one example, the edge clouds 120 and 130 may comprise access networks. For instance, in an illustrative example, edge clouds 120 and 130 may comprise cellular/wireless access networks, e.g., radio access networks (RANs), such as a Universal Terrestrial Radio Access Network (UTRAN), an evolved UTRAN (eUTRAN), or the like. In such an example, the system 100 may comprise an LTE network, and the core network 102 may comprise an Evolved Packet Core (EPC) network, for instance. However, in other, further, and different examples, any one or more of edge clouds 120 and 130 may alternatively or additional comprise a Digital Subscriber Line (DSL) network, a broadband cable access network, a (non-cellular) wireless access networks (e.g., an Institute for Electrical and Electronics Engineers (IEEE) 802.11/Wi-Fi network and the like), and so forth. For example, the operator of telecommunication network 101 may provide a cable television service, an IPTV service, or any other types of telecommunication service to subscribers via the telecommunication network 101.

In one example, the edge clouds 120 and 130 may be in communication with one or more devices 111 and 112, e.g., endpoint devices or user equipment (UE). Edge clouds 120 and 130 may transmit and receive communications between devices 111 and 112, between devices 111-112 and scheduler 104 or other components of core network 102, between devices 111-112 and nodes 125, 126, 135, and 136 (e.g., agent nodes, or host devices, as described in greater detail below), devices reachable via the Internet in general, and so forth. To illustrate, the edge clouds 120 and 130 may comprise one or more access networks as described above. For instance, as illustrated in FIG. 1, each of the edge clouds 120 and 130 may include at least one access point (AP), e.g., AP 121 and AP 131, that may communicate wirelessly with devices 111 and 112 and that may interface with other devices in the respective edge clouds 120 and 130, in the core network 102, over the Internet in general, and so on. Each of the APs 121 and 131 may comprise a cellular base station, such as a base transceiver station (BTS), a NodeB or an evolved NodeB (eNodeB or eNB), a pico eNB (PeNB), e.g., of a pico cell, a home eNB (HeNB), e.g., of a femto cell, a non-cellular AP, e.g., a IEEE 802.11 wireless router/AP, and so on.

In one example, each of devices 111 and 112 may comprise any single device or combination of devices that may comprise a user endpoint device, or client device. For example, the devices 111 and 112 may each comprise a mobile device, a cellular smart phone, a laptop, a tablet computer, a desktop computer, an application server, a bank or cluster of such devices, and the like. In one example, devices 111 and 112 may comprise AR devices such as heads-up displays, wearable or non-wearable optical see-through or video see-through devices, handheld computing devices with at least a camera and a display, and so forth. For instance, as illustrated in FIG. 1, device 111 may comprise a wearable computing device (e.g., smart glasses, augmented reality glasses, a headset, or the like). Similarly, device 112 may comprise a tablet computer, a cellular smartphone, a non-cellular wireless device, or the like.

In one example, devices 111 and 112 may each comprise programs, logic, or instructions for performing functions in connection with examples of the present disclosure for interworking via an edge exchange point among cloud service providers and telecommunication networks using packet tags. For example, devices 111 and 112 may each comprise a computing system or device, such as computing system 500 depicted in FIG. 5, and may be configured to provide one or more operations or functions in connection with examples of the present disclosure for interworking via an edge exchange point among cloud service providers and telecommunication networks using packet tags, as described herein.

As mentioned above, each of edge clouds 120 and 130 may include a plurality of nodes, e.g., nodes 125, 126, 135, and 136. The nodes 125, 126, 135, and 136 may comprise host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the edge clouds 120 and 130 comprise radio access networks, the nodes 125, 126, 135, and 136, and other components of the respective edge clouds 120 and 130 may be referred to as mobile edge infrastructure. The nodes 125, 126, 135, and 136 may comprise servers hosting virtualization platforms for managing one or more virtual machines (VMs), containers, microservices, or the like.

In one example, the nodes 125, 126, 135, and 136 may comprise components of and/or be collocated with the respective APs 121 and 131. Alternatively, or in addition, any one or more of the nodes 125, 126, 135, and 136 may be a component of and/or be collocated with an aggregation point (not shown) that may service multiple access points, e.g., a plurality of base stations. Similarly, any one or more of the nodes 125, 126, 135, and 136 may be a component of and/or be collocated with a radio network controller (RNC) of the respective one of the edge clouds 120 or 130.

In accordance with the present disclosure, the nodes 125, 126, 135, and 136 may be made available to host client services and may be managed and coordinated by scheduler 104. For instance, in one example, the nodes 125, 126, 135, and 136 may be configured to receive and respond to requests for availability from scheduler 104, to provide offers to host client services, to respond to instructions from scheduler 104 to host client services, to obtain images, codes, application data, media content, and other data to instantiate and host a client service from scheduler 104 or from one or more network-based repositories storing such data, to respond to instructions from scheduler 104 to release client services, and so forth. In one example, telecommunication network 101 may provide a service for hosting client services on edge cloud infrastructure to subscribers, e.g., in addition to television, phone, and/or other telecommunication services. The subscribers may comprise individuals or may comprise enterprises, such as a content distribution network (CDN), a video streaming provider, a gaming service provider, or other application providers. In addition, the nodes 125, 126, 135, and 136 may be configured to interact with other computing resources external to the respective edge clouds 120 and 130, such as with nodes 145 and nodes 155 of cloud service providers (CSPs) 140 and 150, respectively, as well as with endpoint devices/UE, such as devices 111 and 112, in connection with the client service(s) instantiated thereon. For instance, the nodes 125, 126, 135, and 136 may operate as streaming video servers, streaming audio servers, virtual assistant servers, translation servers, and so on. In other words, the client services may comprise various types of servers for interactive and/or streaming applications.

In one example, the nodes 125, 126, 135, and 136 may also comprise network function virtualization infrastructure (NFVI), e.g., for software defined network (SDN) services of an operator of the core network 102 and/or the telecommunication network 101 in general, such as virtual mobility management entities (vMMEs), virtual serving gateways (vSGWs), virtual packet data network gateways (vPDNGWs or VPGWs) or other virtual network functions (VNFs). In such an example, the service provider VNFs may be logically separated from any client services which may be allowed to be instantiated on the same mobile edge infrastructure. In another example, nodes hosting client services may be collocated with, but physically separate from any servers which may comprise NFVI for service provider functions/VNFs. For instance, nodes 125 and 135 may be reserved for client services, while nodes 126 and 136 may be reserved for service provider functions/VNFs.

In such an example, the nodes 126 and 136, and the VNFs instantiated thereon, may be controlled and/or managed by the SDN controller 106. For instance, in one example, SDN controller 106 is responsible for such functions as provisioning and releasing instantiations of VNFs to perform the functions of routers, switches, and other devices, provisioning routing tables and other operating parameters for the VNFs, and so forth. In one example, SDN controller 106 may maintain communications with VNFs and/or host devices/NFVI (e.g., nodes 126 and 136) via a number of control links which may comprise secure tunnels for signaling communications over an underling IP infrastructure of network 105. In other words, the control links may comprise virtual links multiplexed with transmission traffic and other data traversing telecommunication network 101 and carried over a shared set of physical links. For ease of illustration the control links are omitted from FIG. 1. In one example, the SDN controller 106 may also comprise a virtual machine operating on NFVI/host device(s), or may comprise a dedicated device.

Figure 5:
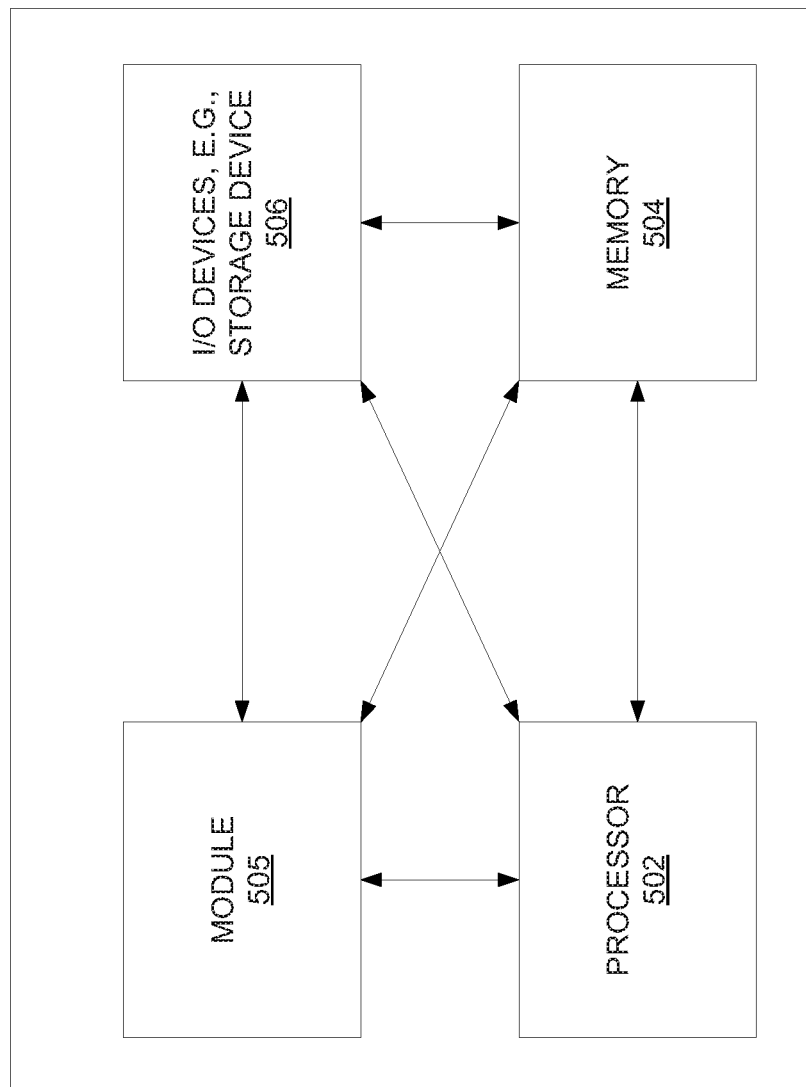
FIG. 5 illustrates a high level block diagram of a computing device specifically programmed to perform the steps, functions, blocks and/or operations described herein.

In one example, each of nodes 125, 126, 135, 136, 145, and 155 may comprise a computing system or server, such as computing system 500 depicted in FIG. 5, and may be configured to provide one or more operations or functions in connection with examples of the present disclosure for interworking via an edge exchange point among cloud service providers and telecommunication networks using packet tags, as described herein (e.g., in accordance with the example methods 300 and 400, respectively). In addition, each of the scheduler 104 and SDN controller 106 may comprise a computing system or server, such as computing system 500 depicted in FIG. 5, and may be configured to provide one or more operations or functions for interworking via an edge exchange point among cloud service providers and telecommunication networks using packet tags, as described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

As further illustrated in FIG. 1, the system 100 includes telecommunication network 160 and cloud service providers (CSPs) 140 and 150. The telecommunication network 160 may be similar to the telecommunication network 101 and may likewise include a plurality of edge clouds (e.g., edge clouds 161 and 162). For ease of illustration, various internal components of telecommunication network 160, and edge clouds 161 and 162, are omitted from FIG. 1. CSPs 140 and 150 may comprise networked computing resources for providing cloud services directly on behalf of the CSPs 140 and 150 and/or for third parties having applications hosted via CSP 140 and/or CSP 150. For instance, CSP 140 and CSP 150 may comprise public or private cloud computing resources in one or more data centers, such as central processing units (CPUs), graphics processing units (GPUs), memory, storage devices, and so forth. The computing resources may operate as servers for hosting virtual machines, containers, microservices, or the like, or for providing various applications, and/or may operate as storage systems for storing databases, data tables, graphs, and so on. In one example, CSP 140 or CSP 150 may comprise a content distribution network (CDN) or at least a portion thereof.

As illustrated in FIG. 1, the system 100 further includes edge exchange points (EXPs) 190 and 195. In accordance with the present disclosure an EXP may interconnect one or more telecommunication networks and one or more cloud service providers. For instance, EXPs 190 and 195 may interconnect telecommunication network 101 (and more specifically edge clouds 120 and 130), telecommunication network 160 (and more specifically edge clouds 161 and 162), cloud service provider (CSP) 140, and CSP 150. In one example, EXPs 190 and 195 may comprise localized Internet exchange points (IXPs) (e.g., providing the same or similar functions and having the same or similar components as an IXP, but at a more limited scale and with greater proximity between the telecommunication network and cloud service provider infrastructure, and with greater proximity to end user's devices, e.g., devices 111 and 112 in the example of FIG. 1). The EXPs 190 and 195 may utilize routing protocols, such as Border Gateway Protocol (BGP) to exchange routes for specific IP addresses with cloud service providers.

In accordance with the present disclosure, an EXP may be provided by a telecommunication network, or may be provided by a third party. Thus, for example, EXP 190 may be provided by telecommunication network 101 and may be a component of edge cloud 130 and/or of the telecommunication network 101 in general. For illustrative purposes, EXP 195 may be deployed and operated by a third party (e.g., not the telecommunication network 101, telecommunication network 160, CSP 140, or CSP 150). In one example, EXPs 190 and 195 may each comprise a computing system or server, such as computing system 500 depicted in FIG. 5, or a hardware switch based upon an application specific integrated circuit (ASIC) or programmable logic device (PLD), and may be configured to provide one or more operations or functions for interworking via an edge exchange point among cloud service providers and telecommunication networks using packet tags, as described herein (e.g., in accordance with the example method 200).

In addition to providing localized IXP functionality, in accordance with the present disclosure the EXPs 190 and 195 may also provide for tag-based routing (e.g., via Multi-Protocol Label Switching (MPLS) "labels") among autonomous systems (e.g., among CSPs and/or telecommunication networks, and more specifically telecommunication network edge clouds). In another example, the tags may comprise segment routing "segments." These segments may be defined using the MPLS-based data plane of segment routing, or an IPv6-based segment routing data plane, referred to as SRv6. In one example, the tags may comprise adjacency segment IDs, since the tags need only have local significance for traffic to cross the EXPs 190 and 195 from a telecommunication network edge cloud to a CSP (or from a CSP to a telecommunication network edge cloud). In one example, a CSP or telecommunication network may request one or more segments to be associated with traffic among the CSP and telecommunication network edge cloud. Thus, multiple segments may result in the same routing via an EXP, while allowing the CSP and telecommunication network edge cloud to still differentiate packet handling actions within the respective domains. In one example, tags may be assigned to cloud service providers (e.g., CSPs 140 and 150) and may have unique meanings at each EXP (e.g., EXPs 190 and 195).

The tags may be used to define specific routing of traffic via an EXP for arbitrary user groups, particular users or devices, subsets of application flows, and so forth. For instance, tags may differentiate users of different endpoint device types, different subscription levels with respect to a service, or different geographic regions. Tags may also be used to reserve bandwidth for a predicted or actual increase in traffic associated with one or more applications for which differentiated routing may be desired, such as for streaming multicast of sporting events. In various examples, tags may be assigned by a telecommunication network (e.g., telecommunication network 101 or telecommunication network 160), by an edge exchange point (e.g., EXP 190 or 195), or by cloud service providers (e.g., CSP 140 or 150). For instance, an EXP may uniquely assign tags to respective CSPs. Thus, the EXP may be guaranteed that two CSPs will not attempt to use the same tag. As such, tag-based packet forwarding by the EXP may be based upon the tag alone. In another example, CSPs or telecommunication networks may select tags. In such an example, the EXP may provide tag-based routing by first identifying a source of a packet and then routing based upon the tag and the identity of the source. In this way, different CSPs or telecommunication networks may utilize the same tags, but still obtain tag-based routing via the EXP.

The EXPs 190 and 195 are configured to route packets in accordance with the tags and may associate the tags with particular destinations (e.g., CSPs 140 and 150, telecommunication networks 101 and 160, etc.). For instance, in one example, the routings associated with tags may be received by the EXPs 190 and 195 via Label Distribution Protocol (LDP) from the entities that are interconnected via the EXPs (e.g., telecommunication networks 101 and 160, CSPs 140 and 150, etc.). If a segment routing header based on an IPv6-based data plane is used, the tags could be represented as IPv6 headers. In this case, the EXPs 190 and 195 (or a router at the EXP) may forward data plane packets similar to an IPv6 router.

Tags may be further defined to represent various actions which may be requested by a cloud service provider and offered by a telecommunication network via a respective edge cloud. For example, tags may be used to define QoS classes, to make bandwidth reservations, to specify that traffic should have particular VNF processing, to cause traffic to be IP multicast, and so on. Since tags may be assigned to cloud service providers, the tags may be defined to be associated with particular applications. As such, a telecommunication network may apply application specific throttling, e.g., in the event of an attack on the application, an unexpected spike in traffic, and so forth.

In addition, tags may be defined by a CSP to convey information to a cloud service provider from the telecommunication network for application traffic in the reverse direction. For example, telecommunication network 101 may maintain subscriber tier information (e.g., regarding devices 111 and 112, and/or the users of such devices). In one example, when a packet is processed by a user plane function in one of the edge clouds 120 or 130 for an application of CSP 140 or CSP 150 relating to one of devices 111 and 112, the user plane function may tag the packet to indicate the subscriber class. A tag may also convey treatment of the packet by the CSP 140 or CSP 150 and/or an application thereof, such as to allow a subscriber to access premium content from the respective CSP 140 or CSP 150. As such, CSP 140 or CSP 150 may be informed of subscriber class and/or access authorization in order to allocate sufficient resources to service a request, e.g., sufficient resources to allow streaming of higher quality video versus lower quality video. In another example, a network gateway of edge cloud 120 or edge cloud 130 may possess metadata about subscriber classes and locations based upon cell site attachment. This information can also be encoded as a packet tag to allow CSP 140 or CSP 150 to know that a packet (or flow of packets) is for a user from a particular area. The CSP 140 or CSP 150, and/or an application thereof, may then select to provide more regionally focused content, for example.

It should be noted that the information conveyed via various tags and the actions associated with such tags may be agreed between respective cloud service providers and telecommunication networks. In one example, the CSP may request the edge cloud to provide the desired services for the CSP application via an edge stack API. Thus, the API allows a CSP to select from among a plurality of well-defined services of the edge cloud that the telecommunication network is capable of and willing to provide. At the data plane layer, the telecommunication network and the cloud service provider are therefore configured to add tags to outgoing packets and to process inbound packets in accordance with one or more defined actions, while EXPs are tasked with routing the packets according to a switching table.

In one example, system 100 may include communication links between edge clouds 120 and/or 130 which bypass the core network 102. As just one example, APs 121 and 131 may provide a wireless mesh connectivity for devices to access core network 102, where the mesh connectivity may also be used to provide access to mobile edge infrastructure in edge cloud 130 via edge cloud 120, without transiting via core network 102. Alternatively, or in addition, the edge clouds 120 and/or 130 may be interconnected via physical links, e.g., fiber optic cable(s), or the like, which may similarly provide access to mobile edge infrastructure for devices that do not necessarily connect via an access point of the respective edge cloud. Thus, for example, the device 112 may establish a session with one of the nodes 135 that may include a wireless link between device 112 and AP 121, and a link between edge cloud 120 and edge cloud 130, which may comprise a physical link, or a wireless link between AP 121 and AP 131, for instance.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like, additional edge clouds, and so forth. Thus, these and other modifications are all contemplated within the scope of the present disclosure.

Figure 2:
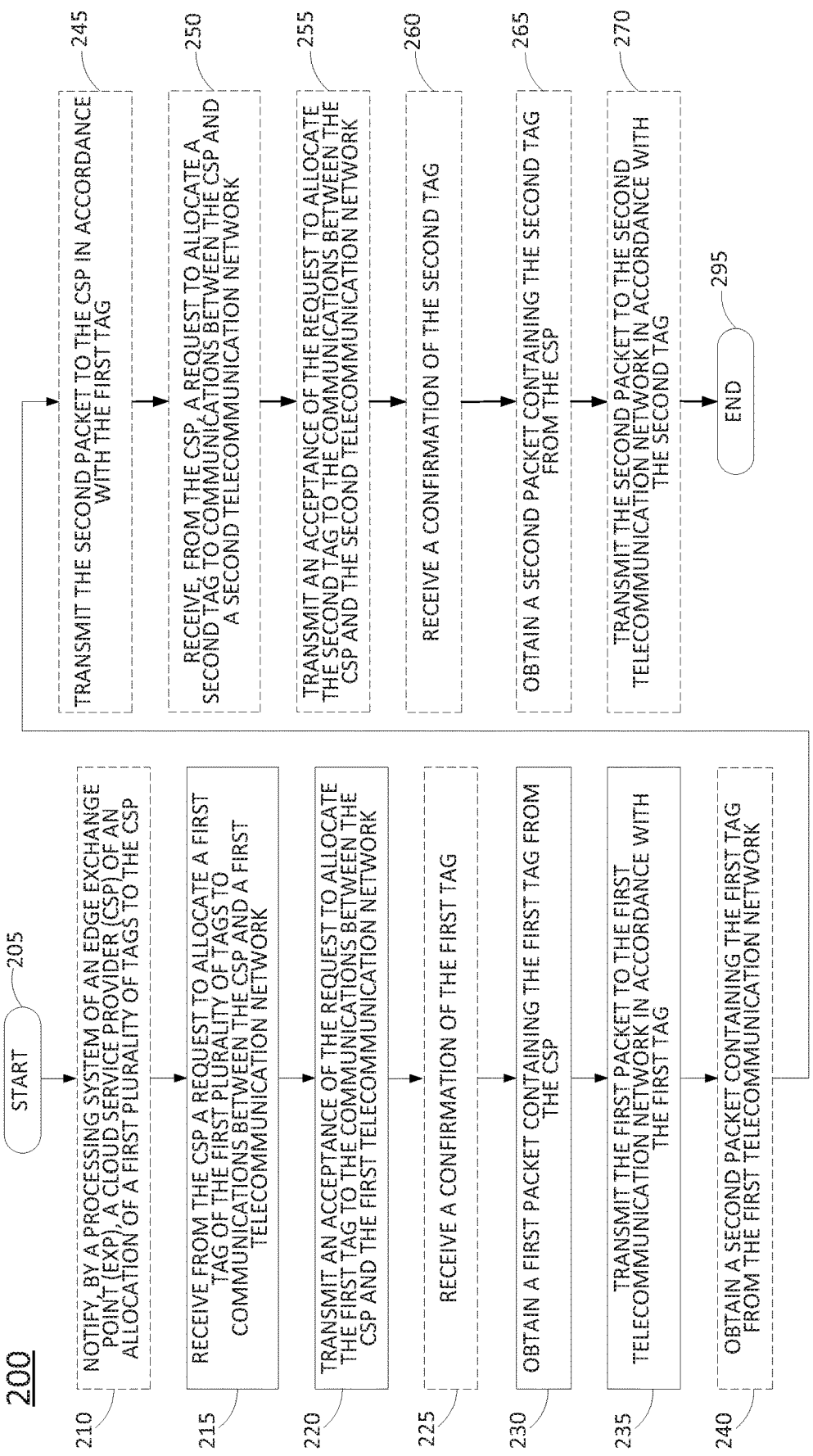
FIG. 2 illustrates a flowchart of a first example method for interworking via an edge exchange point among cloud service providers and telecommunication networks using packet tags.

FIG. 2 illustrates a flowchart of an example method 200 for interworking via an edge exchange point among cloud service providers and telecommunication networks using packet tags, in accordance with the present disclosure. In one example, the method 200 is performed by a component of the system 100 of FIG. 1, such as by one of EXPs 190 or 195, or one or more components thereof (e.g., a processor, or processors, performing operations stored in and loaded from a memory), or by one of the EXPs 190 or 195 in conjunction with one or more other devices, such as one of nodes 125, 126, 135, 136, 145, or 155, and so forth. In one example, the steps, functions, or operations of method 200 may be performed by a computing device or system 500, and/or processor 502 as described in connection with FIG. 5 below. For instance, the computing device or system 500 may represent any one or more components of an EXP in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 500 may collectively function as a processing system. For illustrative purposes, the method 200 is described in greater detail below in connection with an example performed by a processing system. The method 200 begins in step 205 and may proceed to optional step 210 or to step 215.

At optional step 210, the processing system (e.g., of an edge exchange point (EXP)) may notify a cloud service provider (CSP) of an allocation of a first plurality of tags to the CSP. For instance, tags may be allocated by an EXP, and may be uniquely assigned to cloud service providers from among a plurality of cloud service providers that are interconnected via the EXP. The processing system (e.g., the EXP) may also be coupled to edge cloud infrastructure of a plurality of telecommunication networks. In one example, edge cloud infrastructure may comprise host devices deployed in one of: a cell site, a cell aggregation site, or a radio network controller (RNC) site. For instance, a host device may be a component of a base station or other access point (e.g., of an eNodeB, HeNB, PeNB, or the like) or co-located with the access point, may be at an aggregation site, e.g., connecting a plurality of base stations or other access points to a core network, and so on. In this regard, in one example, the edge cloud infrastructure is deployed in a radio access network portion of the telecommunication network. In other words, in one example, the edge cloud infrastructure is deployed external to a cellular core network portion of a telecommunication network (e.g., deployed in the eUTRAN portion of an LTE network, or similarly for a 5G network, and so on).

At step 215, the processing system may receive from the CSP a request to allocate a first tag of the first plurality of tags to communications between the CSP and a first telecommunication network. For example, the tags may be used to define specific routing of traffic via an EXP for arbitrary user groups, particular users or devices, subset of application flows, and so forth. For instance, tags may differentiate users of different endpoint device types, different subscription levels with respect to a service, or different geographic regions. In various examples, tags may be assigned by a telecommunication network, by an EXP, or by CSPs. For instance, an EXP may uniquely assign tags to respective CSPs. Thus, the EXP may be guaranteed that two CSPs may not attempt to use the same tag. As such, tag-based packet forwarding by the EXP may be based upon the tag alone. In another example, CSPs or telecommunication networks may select tags. In such an example, the EXP may provide tag-based routing by first identifying a source of a packet and then routing based upon the tag and the identity of the source. In this way, different CSPs or telecommunication networks may utilize the same tags, but still obtain tag-based routing via the EXP.

In addition, the first tag may be defined by the CSP to represent one or more packet handling actions for the first telecommunication network to perform on behalf of the first CSP. For example, tags may be used to define QoS classes, to make bandwidth reservations, to specify that traffic should have particular VNF processing, to cause traffic to be IP multicast, and so on. Alternatively, or in addition, the first tag may be defined by the CSP to convey information to the CSP from the first telecommunication network for application traffic in the reverse direction.

At step 220, the processing system transmits an acceptance of the request to allocate the first tag to the communications between the CSP and the first telecommunication network. For instance, the CSP may seek an acknowledgement that the EXP will route packets in accordance with the first tag, prior to the cloud service provider and first telecommunication network beginning to send and receive packets that are labeled with the first tag.

At optional step 225, the processing system may receive a confirmation of the first tag. For instance, the CSP may acknowledge that the processing system has accepted the request and that the first tag should be made active by the EXP for routing via the EXP.

At step 230, the processing system obtains a first packet containing the first tag from the CSP. In one example, the first packet may include the first tag in a MPLS header. In other words, the first tag may be included as a MPLS label of the first packet. In another example, the first packet may include the first tag in a segment routing header of the first packet. In other words, the first tag may be included as a segment routing segment of the first packet. The MPLS or segment routing header may be applied by an edge router of the CSP that is connected to the EXP, or may be applied at some internal router of the CSP. For instance, the CSP may configure MPLS to route the packet to an edge router that is connected to the EXP, where the label configuration may indicate to pop a second-to-last label to reach the edge router, where the last label may comprise the first tag, and which may cause the EXP to route the packet to the correct telecommunication network (and similarly for reverse packets from the telecommunication network, which may or may not use MPLS or segment routing internally to reach an edge router of the telecommunication network that is connected to the EXP).

At step 235, the processing system transmits the first packet to the first telecommunication network in accordance with the first tag. For instance, the first packet may be transmitted by the EXP to an edge cloud infrastructure of the first telecommunication network (e.g., to an edge router of the edge cloud infrastructure), where the EXP is coupled to edge cloud infrastructure of a plurality of telecommunication networks, and where the plurality of telecommunication networks includes the first telecommunication network. The first telecommunication network may then further process the first packet in accordance with one or more actions associated with the first tag and defined by the CSP for the first telecommunication network to perform on behalf of the CSP.

At optional step 240, the processing system may obtain a second packet containing the first tag from the first telecommunication network.

At optional step 245, the processing system may transmit the second packet to the CSP in accordance with the first tag. In other words, the same tag may be used for routing in the reverse direction via the EXP.

At optional step 250, the processing system may receive, from the CSP, a request to allocate a second tag to communications between the CSP and a second telecommunication network. In one example, the second tag is included in the first plurality of tags that may be allocated to the CSP at optional step 210. For instance, optional step 250 may comprise the same or similar operations as described above in connection with step 215. However, the CSP may select to use the second tag for communications with a different telecommunication network via the EXP.

At optional step 255, the processing system may transmit an acceptance of the request to allocate the second tag to the communications between the CSP and the second telecommunication network. For instance, optional step 255 may comprise the same or similar operations as described above in connection with step 220.

At optional step 260, the processing system may receive a confirmation of the second tag. For instance, optional step 260 may comprise the same or similar operations as described above in connection with optional step 225.

At optional step 265, the processing system may obtain a second packet containing the second tag from the CSP. For instance, optional step 265 may comprise the same or similar operations as described above in connection with step 230.

At optional step 270, the processing system may transmit the second packet to the second telecommunication network in accordance with the second tag. For instance, optional step 265 may comprise the same or similar operations as described above in connection with step 235.

Following step 235 or any one or more of optional steps 240-270 the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 215-235 or optional steps 240-270 for additional packets, and so forth. Thus, these and other modifications are all contemplated within the scope of the present disclosure.

Figure 3:
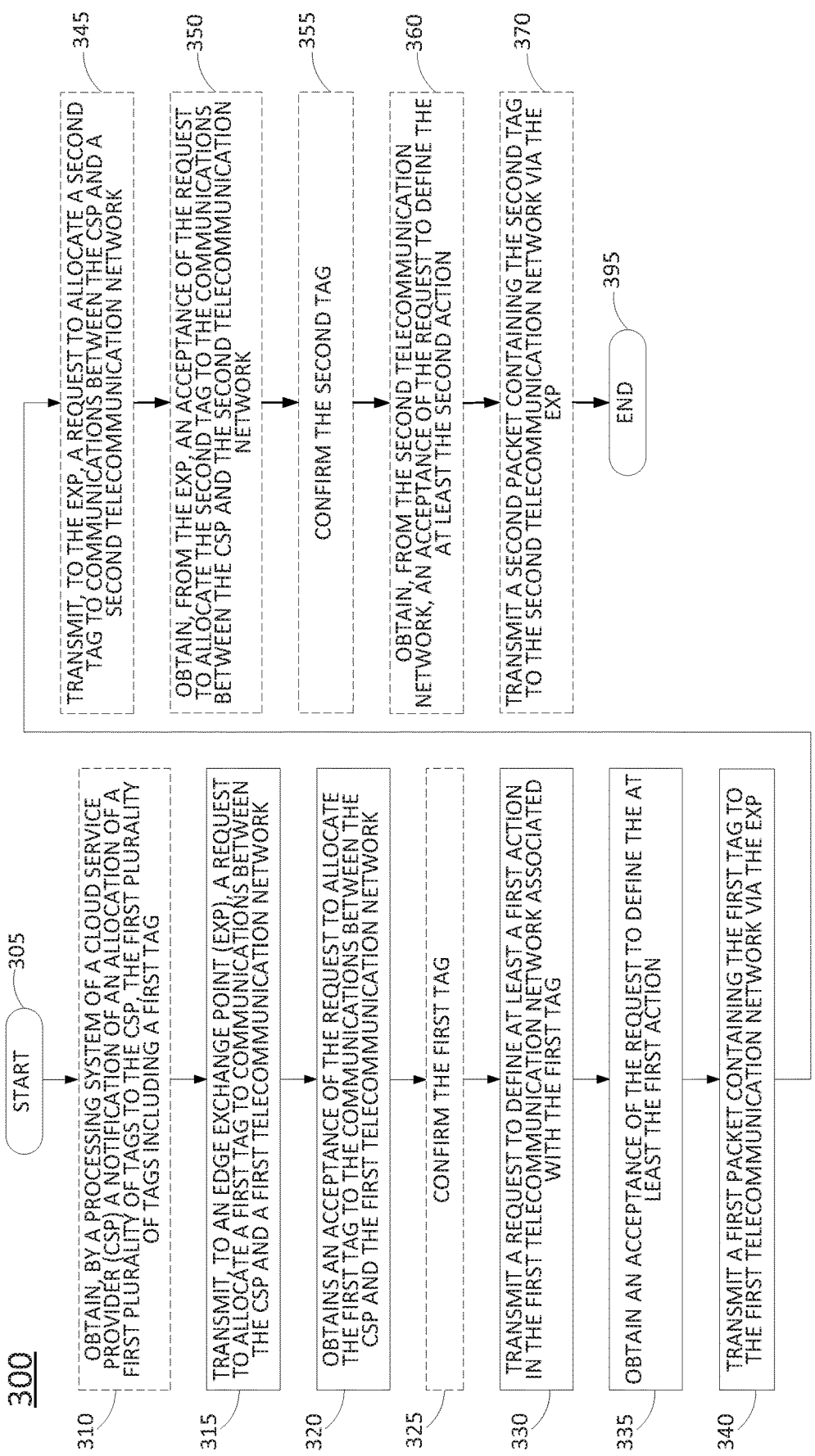
FIG. 3 illustrates a flowchart of a second example method for interworking via an edge exchange point among cloud service providers and telecommunication networks using packet tags.

FIG. 3 illustrates a flowchart of an example method 300 for interworking via an edge exchange point among cloud service providers and telecommunication networks using packet tags, in accordance with the present disclosure. In one example, the method 300 is performed by a component of the system 100 of FIG. 1, such as by one of the cloud service providers 140 or 150, or one or more components thereof (e.g., a processor, or processors, performing operations stored in and loaded from a memory, nodes 145 or 155, etc.), or by one of the cloud service providers 140 or 150 in conjunction with one or more other devices, such as EXP 190 or EXP 195, one or more of nodes 125, 126, 135, or 136, and so forth. In one example, the steps, functions, or operations of method 300 may be performed by a computing device or system 500, and/or processor 502 as described in connection with FIG. 5 below. For instance, the computing device or system 500 may represent any one or more components of a cloud service provider in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 500 may collectively function as a processing system. For illustrative purposes, the method 300 is described in greater detail below in connection with an example performed by a processing system. The method 300 begins in step 305 and may proceed to optional step 310 or to step 315.

At optional step 310, the processing system (e.g., of a cloud service provider (CSP)) may obtain a notification of an allocation of a first plurality of tags to the CSP, the first plurality of tags including a first tag. For instance, the notification may be obtained from an EXP. Tags may be uniquely assigned to cloud service providers from among a plurality of cloud service providers that are interconnected via the EXP. Thus, for example, the EXP may allocate a second plurality of tags to a second cloud service provider, a third plurality of tags to a third cloud service provider, and so forth. The EXP may also be coupled to edge cloud infrastructure of one or more telecommunication networks.

At step 315 the processing system transmits, to an EXP, a request to allocate a first tag to communications between the CSP and a first telecommunication network. The first tag may be one of the first plurality of tags, in an example where optional step 310 is part of the method 300. For instance, tags (such as the first tag) may be used to define specific routing of traffic via an EXP for arbitrary user groups, particular users or devices, subset of application flows, and so forth. For instance, tags may differentiate handling of packets for users of different endpoint device types, different subscription levels with respect to a service, or different geographic regions.

At step 320 the processing system obtains an acceptance of the request to allocate the first tag to the communications between the CSP and the first telecommunication network. For instance, the acceptance may be obtained from the EXP.

At optional step 325, the processing system may confirm the first tag. For example, the CSP may acknowledge that the EXP has accepted the request and that the first tag should be made active by the EXP for routing via the EXP.

At step 330, the processing system transmits a request to define at least a first action in the first telecommunication network associated with the first tag. For instance, the first tag may be defined by the CSP to represent one or more actions for the first telecommunication network to perform on behalf of the first CSP. For example, tags may be used to define QoS classes, to make bandwidth reservations, to specify that traffic should have particular VNF processing, to cause traffic to be IP multicast, and so on. Alternatively, or in addition, the first tag may be defined by the first CSP to convey information to the first CSP from the first telecommunication network for application traffic in the reverse direction.

At step 335, the processing system obtains an acceptance of the request to define the at least the first action. For instance, the acceptance may be from the first telecommunication network.

At step 340, the processing system transmits a first packet containing the first tag to the first telecommunication network via the EXP. In response, the EXP may route the first packet to the first telecommunication network in accordance with the first tag. In addition, the first telecommunication network may perform the at least the first action associated with the first tag in response to receiving the first packet with the first tag. In one example, the processing system may include the first tag in a MPLS header of the first packet. In other words, the first tag may be included as a MPLS label of the first packet. In another example, the processing system may include the first tag in a segment routing header of the first packet. In other words, the first tag may be included as a segment routing segment of the first packet.

At optional step 345, the processing system may transmit a request to allocate a second tag (e.g., of the first plurality of tags, in an example where optional step 310 is included in the method 300) to communications between the CSP and a second telecommunication network, where the request is transmitted to the EXP. For instance, optional step 345 may comprise the same or similar operations as described above in connection with step 315.

At optional step 350, the processing system may obtain an acceptance of the request to allocate the second tag to the communications between the CSP and the second telecommunication network, wherein the acceptance is obtained from the EXP. For instance, optional step 350 may comprise the same or similar operations as described above in connection with step 320.

At optional step 355, the processing system may confirm the second tag. For instance, optional step 355 may comprise the same or similar operations as described above in connection with optional step 325.

At optional step 360, the processing system may transmit, to a second telecommunication network, a request to define at least a second action in the second telecommunication network associated with the second tag. For instance, optional step 360 may comprise the same or similar operations as described above in connection with step 330, e.g., with respect to a second telecommunication network connected to the EXP.

At optional step 365, the processing system may obtain, from the second telecommunication network, an acceptance of the request to define the at least the second action. For instance, optional step 365 may comprise the same or similar operations as described above in connection with step 335.

At optional step 370, the processing system may transmit a second packet containing the second tag to the second telecommunication network via the EXP. For instance, optional step 370 may comprise the same or similar operations as described above in connection with step 340. The EXP may route the second packet to the second telecommunication network in accordance with the second tag. In addition, the second telecommunication network may perform the at least the second action associated with the second tag in response to receiving the second packet with the second tag.

Following step 340 or any one or more of optional steps 345-370 the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 315-340 or steps 315-370, and so forth. In another example, steps 330 and 335 may be performed prior to or in parallel with steps 315-320, or steps 315-325. For example, the CSP may attempt to confirm the action(s) to be associated with a tag in the first telecommunication network at the same time as the CSP attempts to confirm with the EXP the routing to be associated with the first tag. Thus, these and other modifications are all contemplated within the scope of the present disclosure.

Figure 4:
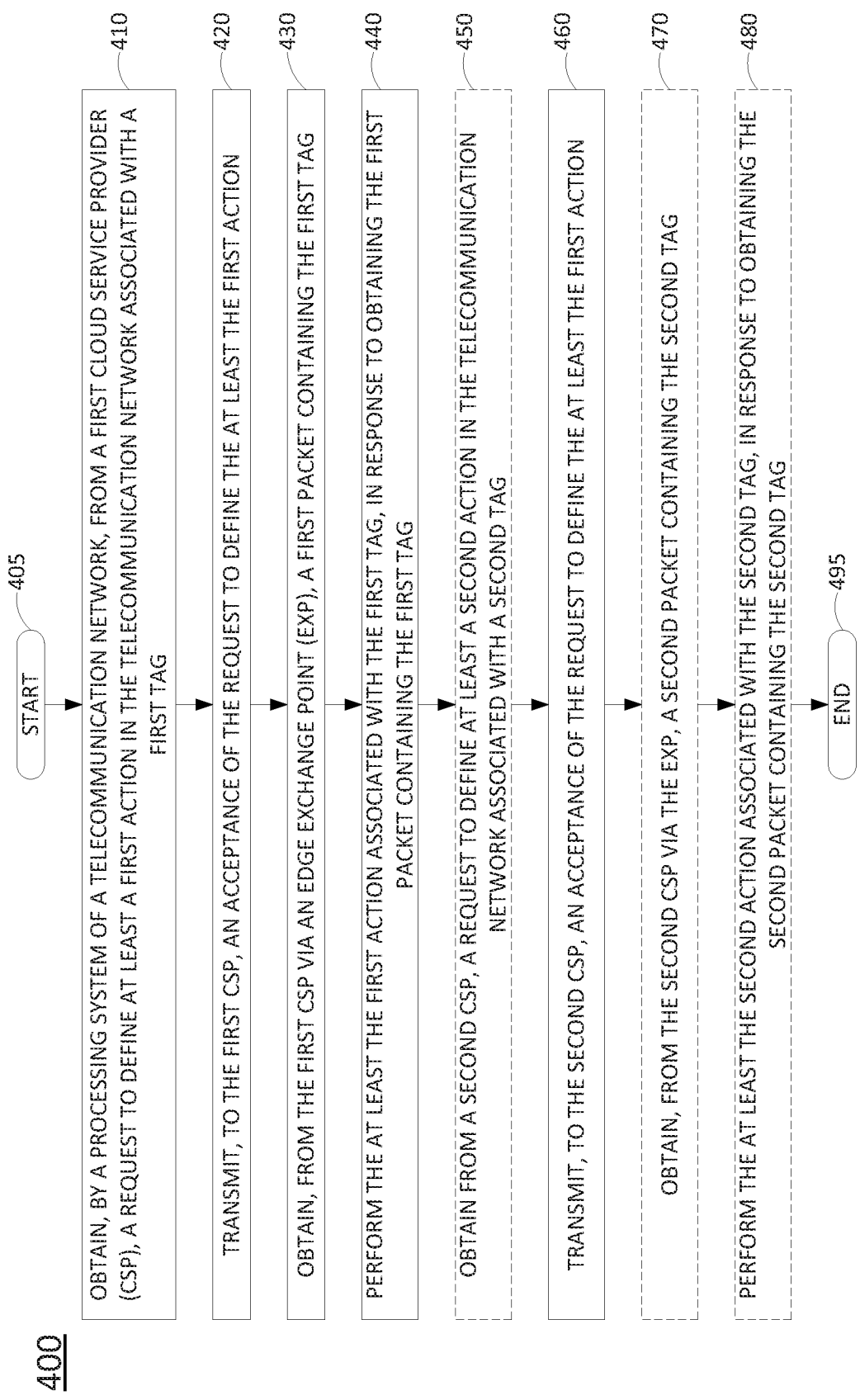
FIG. 4 illustrates a flowchart of a third example method for interworking via an edge exchange point among cloud service providers and telecommunication networks using packet tags.

FIG. 4 illustrates a flowchart of an example method 400 for interworking via an edge exchange point among cloud service providers and telecommunication networks using packet tags, in accordance with the present disclosure. In one example, the method 400 is performed by a component of the system 100 of FIG. 1, such as by telecommunication network 101, or one or more components thereof (e.g., a processor, or processors, performing operations stored in and loaded from a memory, edge clouds 120 or 130 (e.g., edge cloud infrastructure), nodes 125, 126, 135, or 136, etc.), or by one or more components of telecommunication network 101 in conjunction with one or more other devices, such as EXP 190 or EXP 195, CSPs 140 and 150, and/or various components thereof. In one example, the steps, functions, or operations of method 400 may be performed by a computing device or system 500, and/or processor 502 as described in connection with FIG. 5 below. For instance, the computing device or system 500 may represent any one or more components of a telecommunication network in FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system. The method 400 begins in step 405 and proceeds to step 410.

At step 410, the processing system (e.g., of a telecommunication network) obtains, from a first cloud service provider (CSP), a request to define at least a first action in the telecommunication network associated with a first tag. For instance, the first tag may be defined by the first CSP to represent one or more actions for the telecommunication network to perform on behalf of the first CSP. The action(s) may comprise actions that the telecommunication network has indicated may be requested by CSPs and that the telecommunication network is willing and able to provide to CSPs. For example, tags may be used to define QoS classes, to make bandwidth reservations, to specify that traffic should have particular VNF processing, to cause traffic to be IP multicast, and so on. Alternatively, or in addition, the first tag may be defined by the first CSP to convey information to the first CSP from the telecommunication network for application traffic in the reverse direction.

At step 420, the processing system transmits, to the first CSP, an acceptance of the request to define the at least the first action. For instance, the acceptance may be transmitted via an edge exchange point (EXP) that interconnects the first CSP and the telecommunication network.

At step 430, the processing system obtains, from the first CSP via an edge exchange point (EXP), a first packet containing the first tag. For example, the EXP may route the first packet to the telecommunication network in accordance with the first tag. In one example, the telecommunication network is interconnected to a plurality of CSPs via the EXP (where the plurality of CSPs includes the first CSP). Similarly, the telecommunication network may be one of a plurality of telecommunication networks connected via/to the EXP. In one example, the first packet may include the first tag in a MPLS header. In other words, the first tag may be included as a MPLS label of the first packet. In another example, the first packet may include the first tag in a segment routing header of the first packet. In other words, the first tag may be included as a segment routing segment of the first packet. The MPLS or segment routing header may be applied by an edge router of the first CSP that is connected to the EXP, or may be applied at some internal router of the first CSP.

At step 440, the processing system performs the at least the first action associated with the first tag, in response to obtaining the first packet containing the first tag. For instance, the at least the first action may comprise processing the first packet via a particular VNF, providing further routing within the telecommunication network in accordance with a particular QoS, enabling multicasting of the packet, and so forth, e.g., as defined by the first CSP.

At optional step 450, the processing system may obtain from a second CSP, a request to define at least a second action in the telecommunication network associated with a second tag (and associated with the second CSP, if tags are not uniquely assigned by the EXP to CSPs). In one example, the second CSP may be identified by an IP address or other identifier of an edge router of the second CSP connected to the EXP. In one example, optional step 450 may comprise the same or similar operations as described above in connection with step 410.

At optional step 460, the processing system may transmit, to the second CSP, an acceptance of the request to define the at least the first action. For instance, optional step 460 may comprise the same or similar operations as described above in connection with step 420.

At optional step 470, the processing system may obtain, from the second CSP via the EXP, a second packet containing the second tag. For instance, optional step 470 may comprise the same or similar operations as described above in connection with step 430.

At optional step 480, the processing system may perform the at least the second action associated with the second tag, in response to obtaining the second packet containing the second tag. For instance, optional step 480 may comprise the same or similar operations as described above in connection with step 440.

Following step 440 or any one or more of optional steps 450-480 the method 400 proceeds to step 495 where the method ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 410-440 or steps 410-480, and so forth. In another example, optional steps 440-480 may be performed prior to or in parallel with steps 410-440. Thus, these and other modifications are all contemplated within the scope of the present disclosure.

In addition, although not expressly specified above, one or more steps of the method 200, the method 300, or the method 400 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIGS. 2-4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1 or described in connection with the method 200, the method 300, and/or the method 400 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for interworking via an edge exchange point among cloud service providers and telecommunication networks using packet tags, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for interworking via an edge exchange point among cloud service providers and telecommunication networks using packet tags (e.g., a software program comprising computer-executable instructions) can be loaded into memory 504 and executed by hardware processor element 502 to implement the steps, functions or operations as discussed above in connection with the example methods 200, 300, and/or 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for interworking via an edge exchange point among cloud service providers and telecommunication networks using packet tags (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   receiving, by a processing system of an edge exchange point, from a cloud service provider a request to allocate a first tag to packet communications between the cloud service provider and a first telecommunication network of a plurality of telecommunication networks, wherein the edge exchange point interconnects the cloud service provider and the plurality of telecommunication networks including the first telecommunication network;

transmitting, by the processing system, to the cloud service provider, an acceptance of the request to allocate the first tag to the packet communications between the cloud service provider and the first telecommunication network;

obtaining, by the processing system, a first packet containing the first tag from the cloud service provider; and transmitting, by the processing system responsive to the obtaining the first packet containing the first tag, the first packet to the first telecommunication network in accordance with the first tag, wherein the first tag further defines at least a first action in the first telecommunication network associated with the first tag, wherein the at least the first action comprises a differentiated packet handling in the first telecommunication network for packets containing the first tag, wherein the first tag is used for handling a plurality of packets associated with a plurality of different destination entities of the first telecommunication network, and wherein the at least the first action is applied only in the first telecommunication network to the plurality of packets in accordance with the first tag, wherein the at least the first action in the first telecommunication network is distinct from the transmitting the first packet to the first telecommunication network in accordance with the first tag.

2. The method of claim 1, wherein the first packet includes the first tag in a multi-protocol label switching header.

3. The method of claim 2, wherein the first tag is included as a multi-protocol label switching label of the first packet.

4. The method of claim 1, wherein the first packet includes the first tag in a segment routing header.

5. The method of claim 4, wherein the first tag is included as a segment routing segment of the first packet.

6. The method of claim 1, further comprising:

obtaining, by the processing system from the first telecommunication network, a second packet containing the first tag from the first telecommunication network; and transmitting, by the processing system, the second packet to the cloud service provider in accordance with the first tag.

7. The method of claim 1, further comprising:

receiving, by the processing system from the cloud service provider, a request to allocate a second tag to packet communications between the cloud service provider and a second telecommunication network of the plurality of telecommunication networks;

transmitting, by the processing system, an acceptance of the request to allocate the second tag to the packet communications between the cloud service provider and the second telecommunication network;

obtaining, by the processing system, a second packet containing the second tag from the cloud service provider; and transmitting, by the processing system, the second packet to the second telecommunication network in accordance with the second tag.

8. A non-transitory computer-readable medium storing instructions which, when executed by a processing system of an edge exchange point, cause the processing system to perform operations, the operations comprising:

receiving from a cloud service provider a request to allocate a first tag to packet communications between the cloud service provider and a first telecommunication network of a plurality of telecommunication networks, wherein the edge exchange point interconnects the cloud service provider and the plurality of telecommunication networks including the first telecommunication network;

transmitting to the cloud service provider, an acceptance of the request to allocate the first tag to the packet communications between the cloud service provider and the first telecommunication network;

obtaining a first packet containing the first tag from the cloud service provider; and transmitting, responsive to the obtaining the first packet containing the first tag, the first packet to the first telecommunication network in accordance with the first tag, wherein the first tag further defines at least a first action in the first telecommunication network associated with the first tag, wherein the at least the first action comprises a differentiated packet handling in the first telecommunication network for packets containing the first tag, wherein the first tag is used for handling a plurality of packets associated with a plurality of different destination entities of the first telecommunication network, and wherein the at least the first action is applied only in the first telecommunication network to the plurality of packets in accordance with the first tag, wherein the at least the first action in the first telecommunication network is distinct from the transmitting the first packet to the first telecommunication network in accordance with the first tag.

9. The non-transitory computer-readable medium of claim 8, wherein the first packet includes the first tag in a multi-protocol label switching header.

10. The non-transitory computer-readable medium of claim 9, wherein the first tag is included as a multi-protocol label switching label of the first packet.

11. The non-transitory computer-readable medium of claim 8, wherein the first packet includes the first tag in a segment routing header.

12. The non-transitory computer-readable medium of claim 11, wherein the first tag is included as a segment routing segment of the first packet.

13. The non-transitory computer-readable medium of claim 8, the operations further comprising:

obtaining, from the first telecommunication network, a second packet containing the first tag from the first telecommunication network; and transmitting the second packet to the cloud service provider in accordance with the first tag.

14. The non-transitory computer-readable medium of claim 8, the operations further comprising:

receiving, from the cloud service provider, a request to allocate a second tag to packet communications between the cloud service provider and a second telecommunication network of the plurality of telecommunication networks;

transmitting an acceptance of the request to allocate the second tag to the packet communications between the cloud service provider and the second telecommunication network;

obtaining a second packet containing the second tag from the cloud service provider; and transmitting the second packet to the second telecommunication network in accordance with the second tag.

15. A device comprising:

a processing system of an edge exchange point including at least one processor; and a non-transitory computer-readable medium storing instructions which, when executed by the processing system, cause the processing system to perform operations, the operations comprising:

receiving from a cloud service provider a request to allocate a first tag to packet communications between the cloud service provider and a first telecommunication network of a plurality of telecommunication networks, wherein the edge exchange point interconnects the cloud service provider and the plurality of telecommunication networks including the first telecommunication network;

transmitting to the cloud service provider, an acceptance of the request to allocate the first tag to the packet communications between the cloud service provider and the first telecommunication network;

obtaining a first packet containing the first tag from the cloud service provider; and transmitting, responsive to the obtaining the first packet containing the first tag, the first packet to the first telecommunication network in accordance with the first tag, wherein the first tag further defines at least a first action in the first telecommunication network associated with the first tag, wherein the at least the first action comprises a differentiated packet handling in the first telecommunication network for packets containing the first tag, wherein the first tag is used for handling a plurality of packets associated with a plurality of different destination entities of the first telecommunication network, and wherein the at least the first action is applied only in the first telecommunication network to the plurality of packets in accordance with the first tag, wherein the at least the first action in the first telecommunication network is distinct from the transmitting the first packet to the first telecommunication network in accordance with the first tag.

16. The device of claim 15, wherein the first packet includes the first tag in a multi-protocol label switching header.

17. The device of claim 16, wherein the first tag is included as a multi-protocol label switching label of the first packet.

18. The device of claim 15, wherein the first packet includes the first tag in a segment routing header.

19. The device of claim 18, wherein the first tag is included as a segment routing segment of the first packet.

20. The device of claim 15, the operations further comprising:

obtaining, from the first telecommunication network, a second packet containing the first tag from the first telecommunication network; and transmitting the second packet to the cloud service provider in accordance with the first tag.

* * * * *